(12) United States Patent
Devitt

(10) Patent No.: US 11,184,604 B2
(45) Date of Patent: *Nov. 23, 2021

(54) PASSIVE STEREO DEPTH SENSING

(71) Applicant: Compound Eye Inc., Redwood City, CA (US)

(72) Inventor: Jason Devitt, Redwood City, CA (US)

(73) Assignee: Compound Eye, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/936,269

(22) Filed: Jul. 22, 2020

(65) Prior Publication Data

US 2021/0021802 A1    Jan. 21, 2021

Related U.S. Application Data

(63) Continuation of application No. 15/479,101, filed on Apr. 4, 2017, now Pat. No. 10,764,561.

(Continued)

(51) Int. Cl.
*H04N 13/271* (2018.01)
*G06T 7/593* (2017.01)
(Continued)

(52) U.S. Cl.
CPC ........... *H04N 13/271* (2018.05); *G06T 7/593* (2017.01); *H04N 13/128* (2018.05); *H04N 2013/0081* (2013.01)

(58) Field of Classification Search
CPC ............... H04N 13/271; H04N 13/128; H04N 2013/0081; H04N 13/106; G06T 7/593; G06T 2207/10012
See application file for complete search history.

(56) References Cited

U.S. PATENT DOCUMENTS 5,692,063 A     11/1997  Lee et al.
5,875,264 A *   2/1999   Carlstrom ............... G06K 9/50
                                                   382/181

(Continued)

FOREIGN PATENT DOCUMENTS

CA       2842332 A1    1/2013
WO    2020018435 A1    1/2020

OTHER PUBLICATIONS

Cambridge Mobile Telematics :Claims Studio: Reconstruct and Detect Crashes, Jan. 3, 2020, blog.

(Continued)

*Primary Examiner* — Dramos Kalapodas
(74) *Attorney, Agent, or Firm* — Jeffrey Schox; Diana Lin

(57) ABSTRACT

A depth sensing system receives an image pair showing objects in a scene. The system generates binary hashes for pixels in the image pair by performing a random walk. The system matches pixels in the first image to pixels in the second image that depict the same point in the scene by generating cost values representing differences between the binary hashes for pairs of pixels in the images. The system generates a disparity map containing disparity vectors representing coordinate differences between matched pixels in the first and second images. The system generates and outputs a depth map based on the disparity map. The depth map represents the distances between an image acquisition system that acquired the image pair and the objects in the scene.

16 Claims, 9 Drawing Sheets

Related U.S. Application Data

(60) Provisional application No. 62/318,090, filed on Apr. 4, 2016.

(51) Int. Cl.
*H04N 13/128* (2018.01)
*H04N 13/00* (2018.01)

(56) References Cited

U.S. PATENT DOCUMENTS

| | | |
|---|---|---|
| 8,644,620 B1 | 2/2014 | Lam |
| 9,123,118 B2 | 9/2015 | Ciurea et al. |
| 9,704,250 B1* | 7/2017 | Shah .................. G06T 7/55 |
| 10,339,631 B2 | 7/2019 | Price et al. |
| 10,347,111 B1 | 7/2019 | Hollenstain et al. |
| 10,387,962 B1 | 8/2019 | Potter et al. |
| 10,528,844 B2 | 1/2020 | Sugimura et al. |
| 10,762,655 B1 | 9/2020 | Lindskog et al. |
| 10,764,561 B1 | 9/2020 | Devitt |
| 2004/0095999 A1 | 5/2004 | Piehl et al. |
| 2004/0240725 A1 | 12/2004 | Xu et al. |
| 2005/0140670 A1 | 6/2005 | Wu et al. |
| 2005/0275660 A1 | 12/2005 | Keller |
| 2007/0121998 A1* | 5/2007 | Stein .................. G06T 7/55 |
| | | 382/103 |
| 2007/0146232 A1 | 6/2007 | Redert et al. |
| 2008/0273751 A1 | 11/2008 | Yuan et al. |
| 2009/0037491 A1* | 2/2009 | Cachin ................ G06F 21/64 |
| 2010/0295926 A1 | 11/2010 | Estrada et al. |
| 2011/0206236 A1 | 8/2011 | Center |
| 2011/0273582 A1 | 11/2011 | Gayko et al. |
| 2012/0050488 A1* | 3/2012 | Cohen ................ G02B 13/16 |
| | | 348/46 |
| 2012/0250984 A1* | 10/2012 | Taylor .............. G06K 9/00771 |
| | | 382/162 |
| 2012/0306847 A1 | 12/2012 | Lim et al. |
| 2013/0266078 A1* | 10/2013 | Deligiannis .......... H04N 19/115 |
| | | 375/240.25 |
| 2014/0105499 A1 | 4/2014 | Shechtman et al. |
| 2014/0112572 A1* | 4/2014 | Reif .................. G06T 7/33 |
| | | 382/154 |
| 2014/0160247 A1 | 6/2014 | Shi et al. |
| 2014/0309885 A1 | 10/2014 | Ricci |
| 2014/0335902 A1 | 11/2014 | Guba et al. |
| 2015/0042766 A1 | 2/2015 | Ciurea et al. |
| 2015/0348273 A1 | 12/2015 | Chapiro et al. |
| 2016/0093056 A1 | 3/2016 | Ouzounis |
| 2016/0196654 A1 | 7/2016 | Aoki et al. |
| 2016/0267672 A1 | 9/2016 | Ciurea et al. |
| 2017/0161912 A1 | 6/2017 | Yoo et al. |
| 2017/0287169 A1 | 10/2017 | Garcia |
| 2017/0327127 A1 | 11/2017 | Simon |
| 2017/0343356 A1 | 11/2017 | Roumeliotis et al. |
| 2018/0003593 A1 | 1/2018 | Siegel et al. |
| 2018/0018805 A1 | 1/2018 | Kutliroff et al. |
| 2018/0352213 A1 | 12/2018 | Valentin et al. |
| 2019/0007673 A1 | 1/2019 | Karvounis |
| 2019/0065868 A1 | 2/2019 | Tran et al. |
| 2019/0164040 A1 | 5/2019 | Naroditsky et al. |
| 2019/0279387 A1 | 9/2019 | Liu et al. |
| 2019/0311485 A1 | 10/2019 | Buczko et al. |
| 2020/0084427 A1 | 3/2020 | Sun et al. |
| 2020/0349846 A1 | 11/2020 | Siboni et al. |
| 2021/0021802 A1 | 1/2021 | Devitt |
| 2021/0065379 A1 | 3/2021 | Zhang et al. |

OTHER PUBLICATIONS

Bleyer, Michael et al., "PatchMatch Stereo—Stereo Matching with Slanted Support Windows", Patchmatch Stereo, 2011.
Sivaraj, Hemanthkumar et al., "Random Walk Based Heuristic Algorithms for Distributed Memory Model Checking", Electronic Notes in Theoretical Computer Science 89, No. 1 (2003) 17 pages URL: http://elsevier.nl/locate/entcs/volume89.html, Year: 2003).
"Stereo Visual Odometry", Viulib-Vicomtech Solutions, https://www.viulib.org/solutions/s5/stereo_visual_odometry.
Beall, Chris, "Stereo Visual Odometry", CVPR 2014 Visual SLAM Tutorial, Georgia Tech, Institute for Robotics and Intelligent Machines.
Boukamcha, Hamdi, et al., "Robust auto calibration technique for stereo camera", International Conference on Engineering & MIS (ICEMIS), Monastir, Tunisia, 2017, pp. 1-6, doi: 10.1109/ICEMIS.2017.8272992, https://ieeexplore.ieee.org/document/8272992.
Cvisic, Igor, et al., "Stereo odeemetry based on careful feature selection and tracking", IEEE 2015, www.cvlibs.net/datasets/kitti/eval_odometry.php.
Dang, Thao, et al., "Continuous Stereo Self Calibration by Camera Parameter Tracking", IEEE Transactions on Image Processing, vol. 18, No. 7, Jul. 2009.
Distler, Jonathan, "How to Know if Stereo Camera Lose Calibration", https://www.foresightauto.com/how-to-know-if-stereo-cameras-lose-calibration/, Aug. 27, 2020.
Fucek, Luka, et al., "Dense Disparity Estimation in Ego-motion Reduced Search Space", Computer Science, Engineering, ArXiv, published 2017, https://arxiv.org/pdf/1708.06301.pdf.
Hemayed, Elsayed E., et al., "A Survey of Camera Self-Calibration", Proceedings of the IEEE Conference on Advanced Video and Signal Based Surveillance, 2003.
Hsiung, Jerry, et al., "Information Sparsification in Visual-Inertial Odometry", Conference Paper, Proceedings of (IROS) IEEE/RSJ International Conference on Intelligent Robots and Systems, pp. 1146-1153, Oct. 2018.
Lai, Hsueh-Ying, et al., "Bridging Stereo Matching and Optical Flow via Spatiotemporal Correspondence", 2019 IEEE/CVF Conference on Computer Vision and Pattern Recognition (CVPR), Jun. 15-20, 2019, https://ieeexplore.ieee.org/document/8953227.
Mentzer, Nico, et al., "Self-Calibration of Wide Baseline Stereo Camera System for Automative Applications", In book: Towards a Common Software/Hardware Methodology for Future Advanced Driver Assistance Systems. The DESERVE Approach (p. 157-200)Chapter: Self-Calibration of Wide Baseline Stereo Camera Systems for Automotive ApplicationsPublisher: River Publisher.
Mourikis, Anastasios I., et al., "A Multi-State Constraint Kalman Filter for Vision-aided Inertial Navigation", Proceedings 2007 IEEE International Conference on Robotics and Automation, Apr. 10-14, 2007, https://www-users.cs.umn.edu/~stergios/papers/ICRA07-MSCKF.pdf.
Muhovic, Jon, et al., "Correcting Decalibration of Stereo Cameras in Self-Driving Vehicles", Sensors 2020, 20,3241; doi:10.3390/s20113241, ww.mdpi.com/journal/sensors.
Ozuysal, Mustafa, "Manual and Auto Calibration of Stereo Camera Systems", Thesis submitted to the Graduate School of Natural and Applied Sciences of Middle East Technical University, Aug. 2004.
Scaramuzza, Davide, et al., "Visual-Inertial Odometry of Aerial Robots", Springer Encyclopedia of Robotics, 2019.
Straub, J., et al., "Fast Relocation for Visual Odometry Using Binary Features", IEEE International Conference on Image Processing (ICIP), Sep. 2013, https://www.researchgate.net/publication/237048601_Fast_Relocalization_For_Visual_Odometry_Using_Binary_Features.
Usenko, Vladyslav, et al., "Direct Visual-Inertial Odometry with Stereo Cameras", 2016 IEEE International Conference on Robotics and Automation (ICRA), May 16-21, 2016, https://ieeexplore.ieee.org/document/7487335.
Zhuang, Hanqi, et al., "A self-calibration approach to extrinsic parameter estimation of stereo cameras", Robotics and Autonomous Systems 15 (1995) 189-197.
Podder et al. ("Evolution of Visual Odometry Techniques," ARXIV (ID: 1804.11142), Apr. 30, 2018) (Year: 2018).
Rabe et al. ("Fast detection of moving objects in complex scenarios," Proc. IEEE Symp. Intelligent Vehicles, Jun. 2007) (Year: 2007).
Roberts et al. ("Learning general optical flow subspaces for egomotion estimation and detection of motion anomalies," IEEE Conference on Computer Vision and Pattern Recognition, Jun. 20-25, 2009) (Year: 2009).

(56) References Cited

OTHER PUBLICATIONS

Scaramuzza, Davide ("Visual Odometry [Tutorial]," IEEE Robotics & Automation Magazine, vol. 18, Is. 4, Dec. 2011) (Year: 2011).
Talukder et al. ("Real-time detection of moving objects from moving vehicles using dense stereo and optical flow," IEEE/RSJ International Conference on Intelligent Robots and Systems, Sep. 28-Oct. 2, 2004) (Year: 2004).
Zhang et al. ("Visual odometry for the Autonomous City Explorer," IEEE/RSJ International Conference on Intelligent Robots and Systems, Oct. 10-15, 2009) (Year: 2009).
"Low-discrepancy sequence", https://en.wikipedia.org/wiki/Low-discrepancy_sequence.
Banz, C. et al., "Evaluation of Penalty Functions for Semi-Global Matching Cost Aggregation", Int. Arch. Photogramm. Remote Sens. Spatial Inf. Sci. 2012.
Banz, C. et al., "Real-time stereo vision system using semi-global matching disparity estimation: Architecture and FPGA-implementation", in 2010 International Conference on Embedded Computer Systems: (IEEE, 2010).
Baraldi, Patrizia et al., "Motion and Depth from Optical Flow", AVC 1989 doi:10.5244/C.3.35.
Barron, J.L. et al., "Performance of Optical Flow Techniques", IJCV 12:1, pp. 43-77, 1994.
Bleyer, M. et al., "PatchMatch Stereo—Stereo Matching with Slanted Support Windows", in Proceedings of the British Machine Vision Conference 2011 14.1-14.11 (British Machine Vision Association, 2011). doi:10.5244/C.25.14.
Bleyer, Michael et al., "Stereo Matching—State-of-the-Art and Research Challenges", In book: Advanced Topics in Computer Vision (pp. 143-179) Publisher: Springer, Jan. 2013.
Chang, J.R. et al., "Pyramid Stereo Matching Network", arXiv:1803.08669 [cs] (2018).
Cormack, Lawrence K. et al., "Binocular Mechanisms of 3D Motion Processing", https://www.ncbi.nlm.nih.gov/pmc/articles/PMC5956901/.
Geiger, A. et al., "Efficient Large-Scale Stereo Matching. in Computer Vision", ACCV 2010 (eds. Kimmel, R., Klette, R. & Sugimoto, A.) vol. 6492 25-38 (Springer Berlin Heidelberg, 2011).
Godard, C. et al., "Unsupervised Monocular Depth Estimation with Left-Right Consistency", arXiv:1609.03677 [cs, stat] (2017).
Hatzitheodorou, M. et al., "Stereo Matching Using Optic Flow", American College of Greece, 2000, Academic press, 16 pages.
Hirschmuller, H. , "Stereo Processing by Semiglobal Matching and Mutual Information", IEEE Trans. Pattern Anal. Mach. Intell. 30, 328-341 (2008).

Jonschkowski, Rico et al., "What Matters in Unsupervised Optical Flow", arXiv:2006.04902v2 [cs.CV] Aug. 14, 2020.
Kendall, A. , "End-to-End Learning of Geometry and Context for Deep Stereo Regression", arXiv:1703.04309 [cs] (2017).
Laga, H. , et al., "A Survey on Deep Learning Techniques for Stereo-based Depth Estimation", arXiv:2006.02535 [cs] (2020).
Lee, D.J. , et al., "Hardware Implementation of a Spline-Based Genetic Algorithm for Embedded Stereo Vision Sensor Providing Real-Time Visual Guidance to the Visually Impaired", EURASIP J. Adv. Signal Process. 2008.
Marr, D. et al., "Cooperative Computation of Stereo Disparity", Science 194, 283-287 (1976).
Nie, Y. et al., "Adaptive rood pattern search for fast block-matching motion estimation", IEEE Transactions on Image Processing (2002).
Park, Jinsun et al., "Non-Local Spatial Propagation Network for Depth Completion", arXiv:2007.10042v1 [cs.CV] Jul. 20, 2020.
Psarakis, E.Z. , "An enhanced correlation-based method for stereo correspondence with subpixel accuracy", in Tenth IEEE International Conference on Computer Vision, vol. 1, pp. 907-912.
Rahnama, O. et al., "Real-Time Dense Stereo Matching With ELAS on FPGA Accelerated Embedded Devices", IEEE Robot. Autom. Lett. 3, 2008-2015 (2018).
Rong, G. et al., "Variants of Jump Flooding Algorithm for Computing Discrete Voronoi Diagrams", in Proceedings of the 4th International Symposium on Voronoi Diagrams in Science and Engineering 176-181 (IEEE Computer Society, 2007).
Rossi, M. et al., "Joint Graph-Based Depth Refinement and Normal Estimation", in 2020 IEEE/CVF Conference on Computer Vision and Pattern Recognition 12151-12160 (IEEE, 2020).
Scharstein, D. , "A taxonomy and evaluation of dense two-frame stereo correspondence algorithms", in Proceedings IEEE Workshop on Stereo and Multi-Baseline Vision (SMBV 2001) 131-140 (IEEE Comput. Soc, 2001).
Sun, D. et al., A Quantitative Analysis of Current Practices in Optical Flow Estimation and the Principles Behind Them, Int J Comput Vis 106, 115-137 (2014).
Tatsumi, S. et al., "An FPGA accelerator for PatchMatch multi-view stereo using OpenCL", J Real-Time Image Proc 17, 215-227 (2020).
Zabih, R. et al., "Non-parametric Local Transforms for Computing Visual Correspondence", in ECCV (1994).
International Search Report and Written Opinion for Application No. PCT/US2021/014459 dated Jun. 22, 2021.
Knoblauch, Daniel , et al., "Factorization of Correspondence and Camera Error for Unconstrained Dense Correspondence Applications", UC Davis, IDAV Publications, 2009.

\* cited by examiner

PASSIVE STEREO DEPTH SENSING

CROSS-REFERENCE TO RELATED APPLICATIONS

This application is a continuation of U.S. application patent application Ser. No. 15/479,101, filed on 4 Apr. 2017, which claims the benefit of U.S. Provisional Application Ser. No. 62/318,090, filed on 4 Apr. 2016, all of which are incorporated in its entirety by this reference.

TECHNICAL FIELD

This disclosure relates generally to passive depth sensing and more particularly to inferring depth from two or more images of a scene.

BACKGROUND

Depth sensing can be used for a variety of different applications, such as assisting in the navigation of autonomous vehicles and other robots, building a 3D model of a person, object, or scene, or inserting virtual objects into a live scene (sometimes called augmented reality). Passive depth sensing has many advantages over active sensing techniques such as sonar, radar, or structured light. For instance, passive depth sensing allows for greater range, higher spatial resolution, and a wider spectrum. But conventional passive depth sensing techniques tend to be computationally intensive and often take a powerful computer several seconds or minutes to generate depth information. These computational requirements limit the adoption of conventional passive depth sensing techniques.

BRIEF DESCRIPTION OF THE FIGURES

The above and other issues are addressed by a method, computer-readable storage medium, and system for generating a disparity map representing distances between an image acquisition system and objects in a scene captured by the image acquisition system.

Embodiments of the method comprise receiving a stereoscopic image pair comprising a first image and a second image. The first image and the second image are captured by an image acquisition system at a substantially same time. The first image captures a view of a scene from a first perspective and the second image captures a view of the scene from a second perspective. The method generates binary hashes for pixels in the first and second images. Generating a binary hash comprises performing a random walk on a pixel patch surrounding the pixel. The method matches pixels in the first and second images that depict the same points in the scene responsive to cost values. The cost values represent differences between binary hashes for the pixels. The method generates a disparity map that represents distances between the image acquisition system and the objects in the scene responsive to the matching pixels. The disparity map comprises a plurality of disparity vectors. Each disparity vector represents a coordinate difference matched pixels in the first and second images.

Embodiments of the computer-readable storage medium store computer program instructions comprising instructions for receiving a stereoscopic image pair comprising a first image and a second image. The first image and the second image are captured by an image acquisition system at a substantially same time. The first image captures a view of a scene from a first perspective and the second image captures a view of the scene from a second perspective. The instructions further comprise instructions for generating binary hashes for pixels in the first and second images. Generating a binary hash comprises performing a random walk on a pixel patch surrounding the pixel. The instructions further comprise instructions for matching pixels in the first and second images that depict the same points in the scene responsive to cost values. The cost values represent differences between binary hashes for the pixels. The instructions additionally comprise generating a disparity map that represents distances between the image acquisition system and the objects in the scene responsive to the matching pixels. The disparity map comprises a plurality of disparity vectors. Each disparity vector represents a coordinate difference matched pixels in the first and second images.

Embodiments of the system comprise a computer-readable storage medium storing executable computer program instructions comprising instructions for receiving a stereoscopic image pair comprising a first image and a second image. The first image and the second image are captured by an image acquisition system at a substantially same time. The first image captures a view of a scene from a first perspective and the second image captures a view of the scene from a second perspective. The instructions further comprise instructions for generating binary hashes for pixels in the first and second images. Generating a binary hash comprises performing a random walk on a pixel patch surrounding the pixel. The instructions further comprise instructions for matching pixels in the first and second images that depict the same points in the scene responsive to cost values. The cost values represent differences between binary hashes for the pixels. The instructions additionally comprise generating a disparity map that represents distances between the image acquisition system and the objects in the scene responsive to the matching pixels. The disparity map comprises a plurality of disparity vectors. Each disparity vector represents a coordinate difference matched pixels in the first and second images.

BRIEF DESCRIPTION OF THE FIGURES

Figure 1:
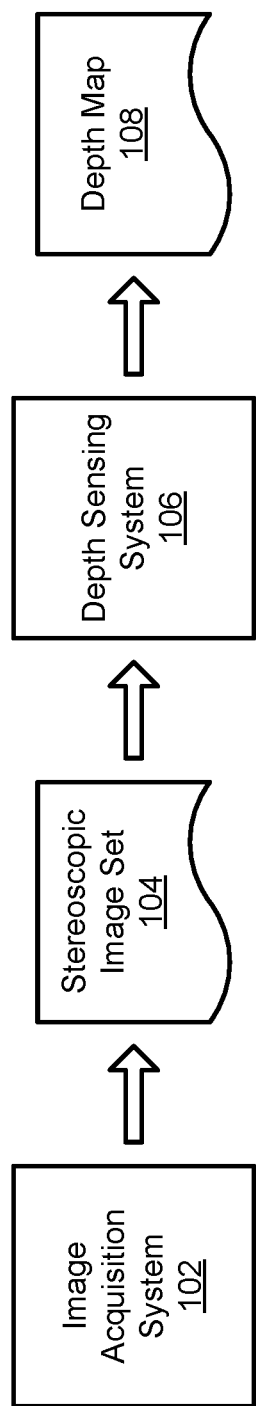

FIG. 1 is a diagram illustrating a system environment for a depth sensing system, according to one embodiment.

Figure 2:
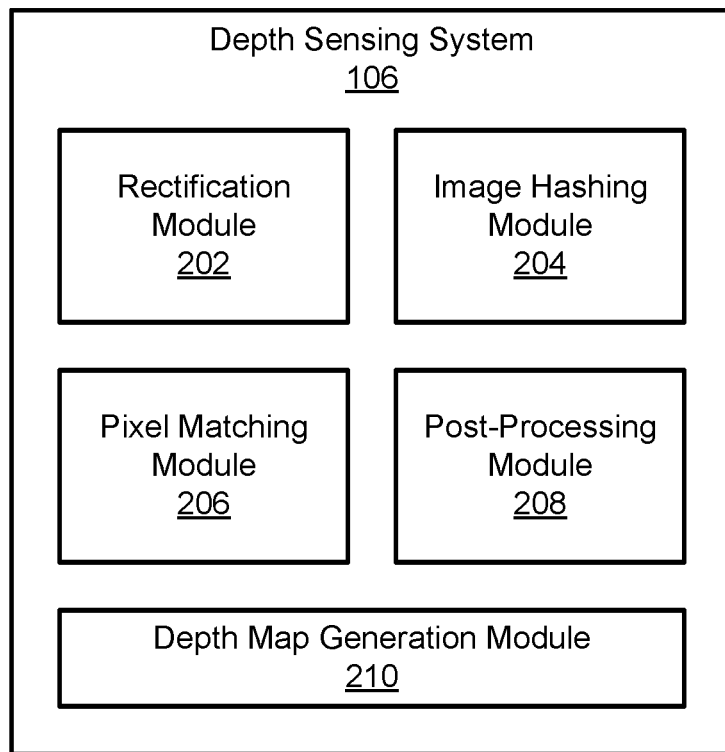

FIG. 2 is a high-level block diagram illustrating a detailed view of the depth sensing system, according to one embodiment.

Figure 3:
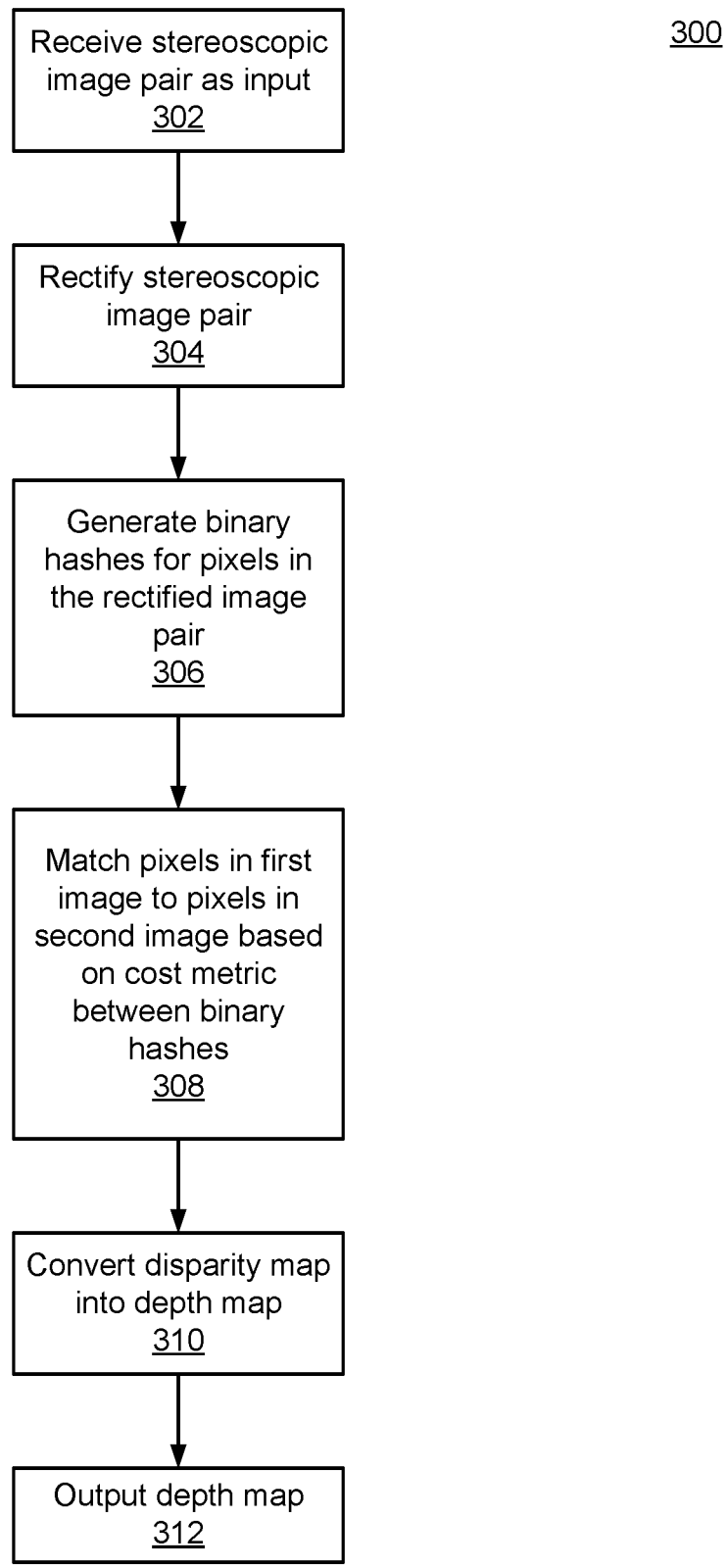

FIG. 3 is a flow chart illustrating a method for performing depth sensing, according to one embodiment.

Figure 4A:
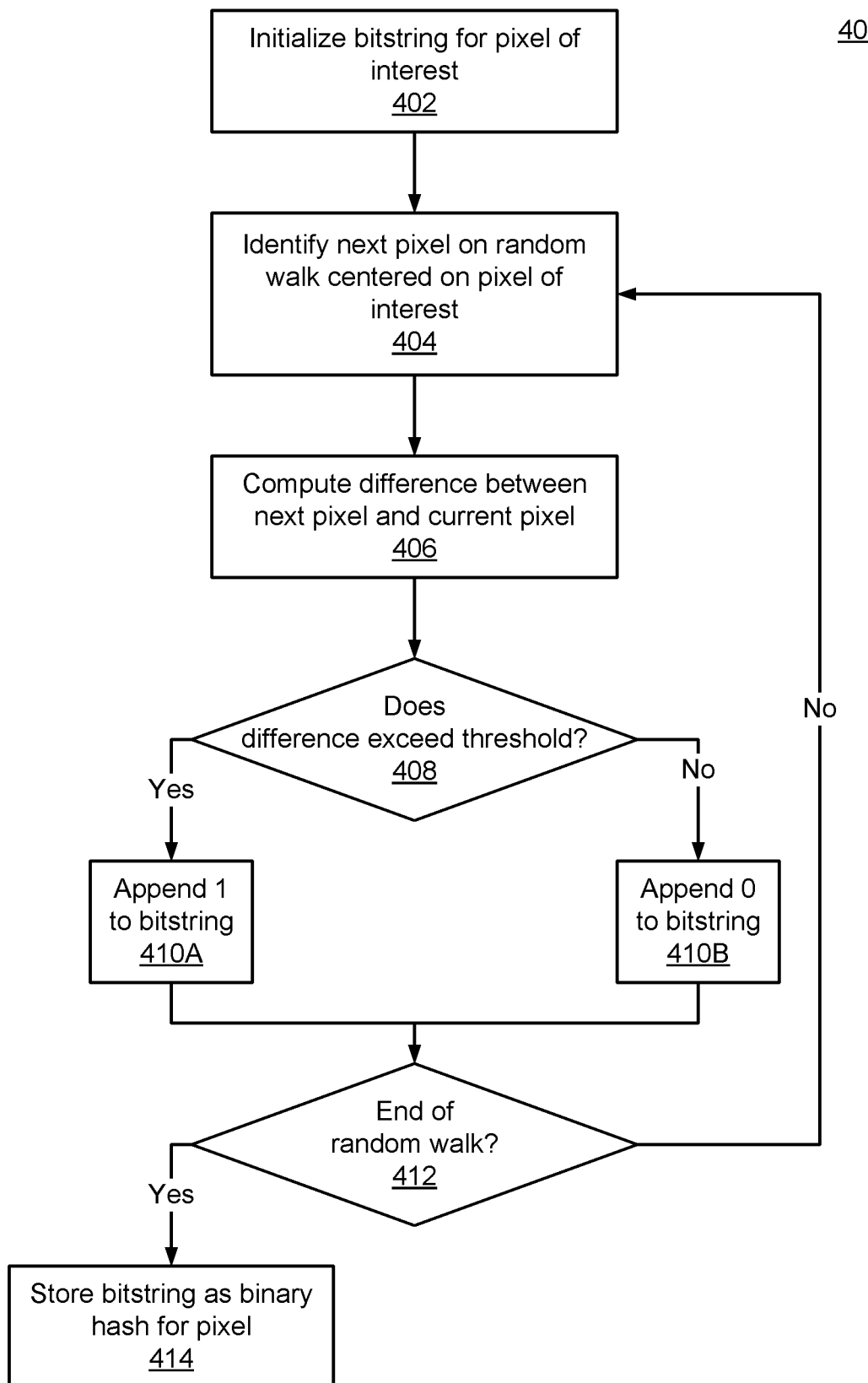

FIG. 4A is a flow chart illustrating a method for generating a binary hash for a pixel, according to one embodiment.

Figure 4B:
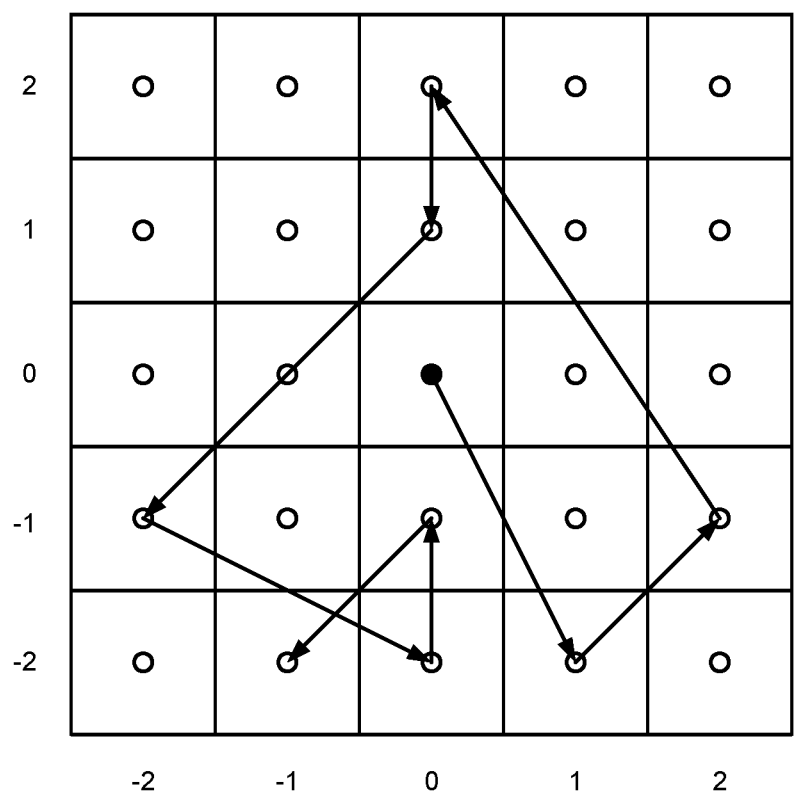
Figure 4C:
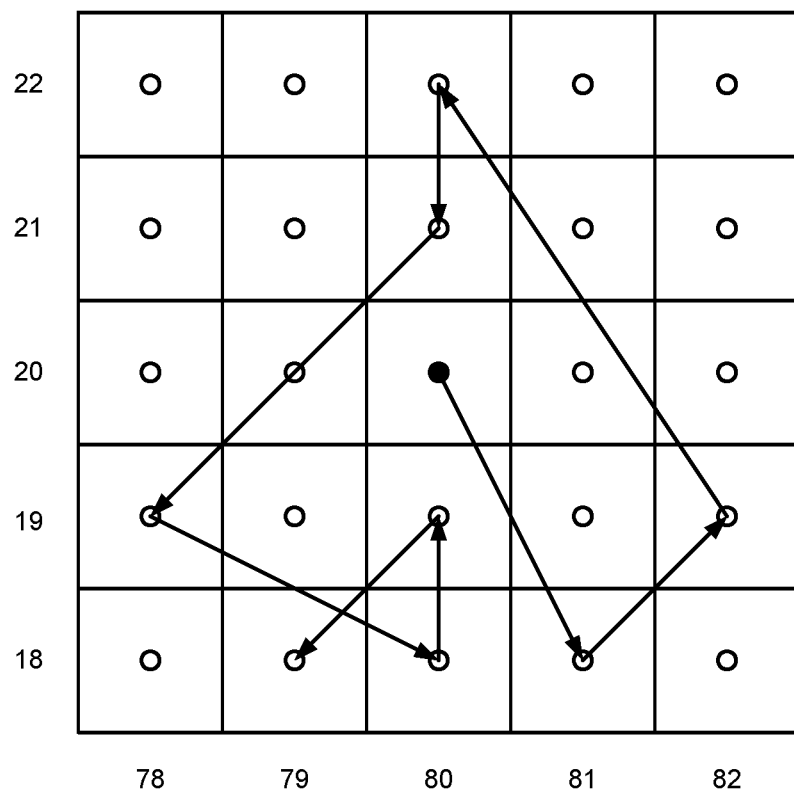

FIGS. 4B and 4C are diagrams illustrating an example of a random walk through a pixel patch, according to one embodiment.

Figure 5A:
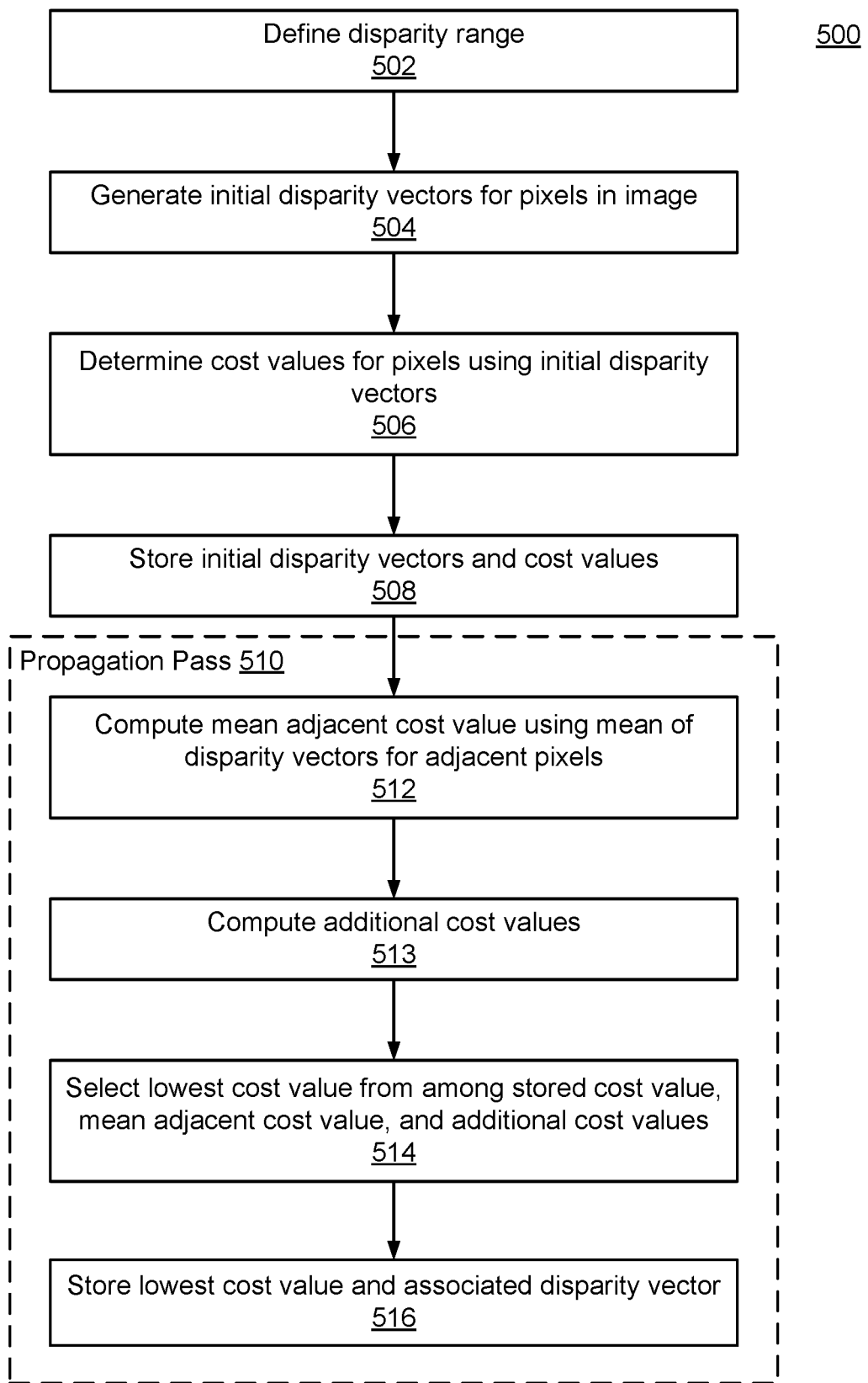

FIG. 5A is a flow chart illustrating a method for matching pixels in one image of the stereoscopic image pair to pixels in the other image of the stereoscopic image pair, according to one embodiment.

Figure 5B:
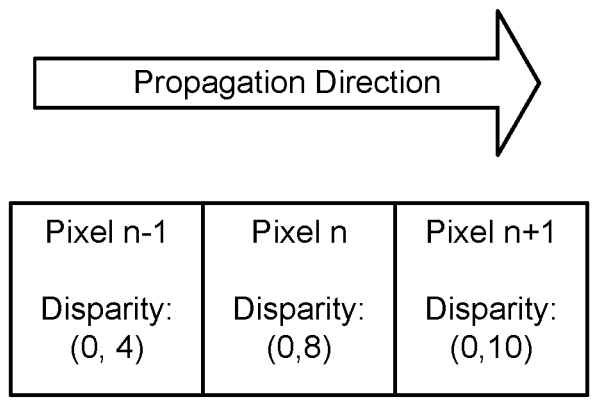
Figure 5C:
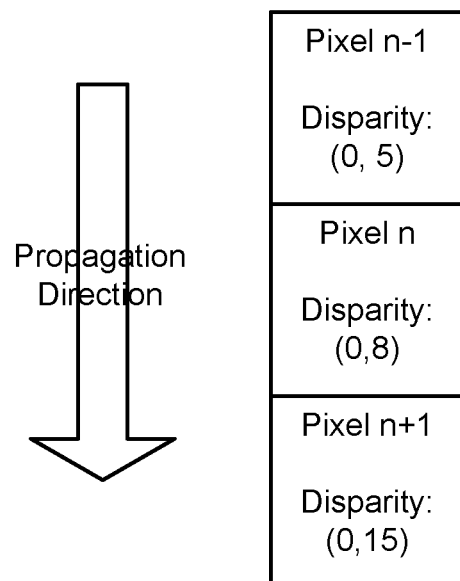

FIGS. 5B and 5C are diagrams illustrating examples of propagation passes that are performed as part of the method for matching pixels, according to one embodiment.

Figure 6:
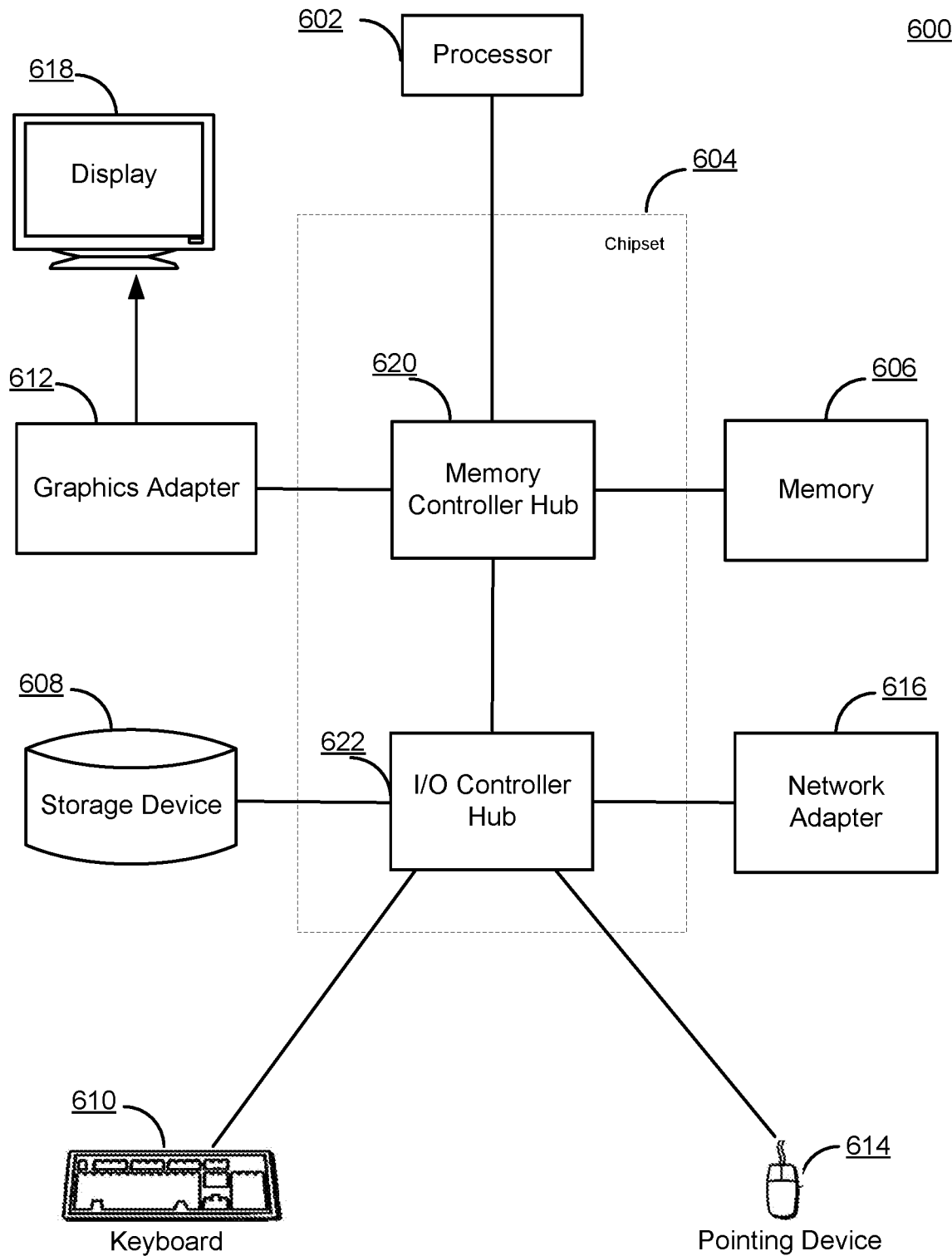

FIG. 6 is a high-level block diagram illustrating an example of a computer for use as the depth sensing system, according to one embodiment.

DESCRIPTION OF THE PREFERRED EMBODIMENTS

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made to several embodiments, examples of which are illustrated in the accompanying figures. FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A" and/or "112B" in the figures).

FIG. 1 is a diagram illustrating a system environment 100 for a depth sensing system 106, according to one embodiment. The system environment 100 includes an image acquisition system 102 and the depth sensing system 106. In various embodiments, the system environment 100 shown in FIG. 1 may be part of an augmented reality system or an autonomous vehicle, such as a self-driving automobile or an unmanned aerial vehicle (e.g., a quadcopter drone).

The image acquisition system 102 captures stereoscopic images and provides the images as output in the form of a stereoscopic image set 104. As referred to herein, a stereoscopic image set 104 (also referred to herein as a stereoscopic image pair) comprises two or more images of a scene (e.g., a place in the real world) captured at substantially the same time from different spatial positions. For example, the images of the stereoscopic image set 104 may comprise two images whose centers of projection are spaced 60 millimeters (mm) apart (e.g., the typical distance between the centers of the pupils in an adult's eyes). Because the images are captured from different spatial positions, they depict the same scene from different perspectives. In other words, one of the images captures a view of the scene from a first perspective, another image captures a view of the scene from a second perspective, and so on. In various embodiments, the image acquisition system 102 may be configured to capture still images and/or a video feed. Thus, the images of the stereoscopic image set 104 may either be still images of a scene or frames (captured at substantially the same time) in a stereoscopic video feed of a scene.

The image acquisition system 102 includes imaging components that are capable of capturing the images in the stereoscopic image set 104 along substantially parallel optical axes and on substantially the same image plane. In one embodiment, the image acquisition system 102 includes two or more digital cameras that capture the images. In another embodiment, the image acquisition system 102 includes one camera with two or more apertures that allow the image sensor of the camera to capture the images. In still another embodiment, the image acquisition system 102 includes one camera with one aperture and further includes a mirror system that directs two or more views of the scene onto the lens and sensor of the camera.

Throughout this description, it is assumed that there are two images in the stereoscopic image set 104 (hereinafter referred to as the stereoscopic image pair), and these images are referred to individually as the first image and the second image and together as the stereoscopic image pair. The use of the terms "first" and "second" are merely meant to differentiate the two images and does not necessarily describe a spatial relationship between the two images. For instance, in an embodiment where the image acquisition system 102 captures two images along a horizontal axis (e.g., with one image plane on the left and the other image plane on the right), the first image may refer to the left image and the second image may refer to the right image, or vice versa.

Furthermore, this description also refers to components of the image acquisition system 102 as the first camera and the second camera. As used herein, the first camera refers to an ideal pinhole camera that models the components of the image acquisition system 102 that contributed to the acquisition of the first image, and the second camera refers to an ideal pinhole 6 camera that models the components of the image acquisition system 102 that contributed to the acquisition of the second image. Similarly, reference is made to attributes of the first and second cameras, such as the focal lengths of the first and second cameras. As used herein, attributes of the first and second cameras refer to the attributes of the corresponding ideal pinhole cameras that model the components in the image acquisition system 102. For example, in an embodiment where the image acquisition system 102 contains two separate digital cameras that capture the first and second images, then the focal lengths of the first and second cameras are similar to (and sometimes identical to) the respective focal lengths of the separate digital cameras; however, in an embodiment where the image acquisition system contains a single digital camera with two apertures, the focal lengths of both the first and second camera refer to the focal lengths of two ideal pinhole cameras that together model the single digital camera with two apertures. In some embodiments, such as systems that include two or more omnidirectional cameras, the elements of the image acquisition system 102 may not be correctly modeled by ideal pinhole cameras, but the methods herein can be adapted to such embodiments.

The depth sensing system 106 receives a stereoscopic image set 104 (e.g., from the image acquisition system 102 and generates a depth map 108 therefrom. The depth map 108 is formed of multiple depth measurements. Each depth measurement corresponds to a pixel in the first image and represents the depth or distance from the image acquisition system 104 to the point in the scene depicted by the pixel. In one embodiment, the depth map 108 is a two dimensional array of depth measurements where each depth measurement is stored at an index in the array that represents the index of the pixel corresponding to the depth measurement. For instance, the depth measurement for the pixel at coordinates (100, 10) in the first image (assuming, without loss of generality, a two dimensional pixel coordinate system) may be stored in the two-dimensional array at the index [100, 10]. As a whole, the depth map 108 describes the distances between the image acquisition system 104 and various objects in the scene. For example, a contiguous region of pixels with small depth measurements may represent a single object in the foreground of the scene, whereas a region of pixels with relatively large depth measurements may represent one or more objects in the background of the scene.

In one embodiment, the depth sensing system 106 generates the depth map 108 by performing a process that includes five steps: rectifying the stereoscopic image pair; generating binary hashes for pixels in the rectified image pair; generating a disparity map by using the binary hashes to match pixels in the first image to corresponding pixels in the second image; post-processing the disparity map; and generating the depth map based on the disparity map. A more detailed description of the functionality of the depth sensing system 106 is provided below with reference to FIGS. 2 and 3.

In one embodiment, the image acquisition system 102 and the depth sensing system 106 are implemented as components of a single electronic device, such as a mobile device (e.g., a smartphone) that includes an image acquisition system and further includes hardware or software that implement the functions of depth sensing system 106. In another embodiment, the image acquisition system 102 and the depth sensing system 106 are separate electronic devices. For example, the image acquisition system 102 is mounted on the roof of an autonomous automobile and records stereoscopic image pairs 104, and the stereoscopic image pairs 104 are sent over a communicative connection to a computing device inside the automobile that implements the functions of the depth sensing system 106. As another example, the image acquisition system 102 records stereoscopic image pairs 104 onto a storage device (e.g., a flash memory card), the depth sensing system 106 is a computing system that includes hardware capable of reading the storage device (e.g., a memory card reader), and a user transfers the flash memory card from image acquisition system 102 to the depth sensing system 106.

Although not shown in FIG. 1, the depth map 108 may be provided to another system that uses the depth map 108 for one or more applications. For example, the image acquisition system 102 may be mounted on an autonomous vehicle, such as a self-driving automobile or an unmanned aerial vehicle (e.g., a quadcopter drone), and the depth map 108 may be provided to a system that uses the depth map 108 to determine the distance between the vehicle and objects in the scene. The objects and their distances can then be provided as input to an obstacle avoidance algorithm. The functions of the other system may be implemented in the same electronic device as the depth sensing system 106 or in a different device that can receive depth maps 108 from the device that implements the depth sensing system 106, either over a communicative connection between the two devices or when a storage device is physically transferred between the two devices.

FIG. 2 is a high-level block diagram illustrating a detailed view of the depth sensing system 106, according to one embodiment. In the embodiment shown in FIG. 2, the depth sensing system 106 includes a rectification module 202, an image hashing module 204, a pixel matching module 206, a post-processing module 208, and a depth map generation module 210. In other embodiments, the depth sensing system 106 may include additional, fewer, or different modules, and the functionality of the depth sensing module 106 as described herein may be distributed among its modules in a different manner.

The rectification module 202 receives a stereoscopic image pair and rectifies the stereoscopic image pair to generate a rectified image pair. Rectification digitally modifies the first image and/or the second image to generate two rectified images (i.e., the rectified image pair) that are co-planar and aligned such that their epipolar lines are parallel. Rectification is performed on the stereoscopic image pair because the image acquisition system 102 may capture the first and second images on slightly different planes. For instance, the positions of image sensors, mirrors, and other imaging components may be shifted from their intended positions due to factors such as thermal expansion of structural elements, displacement due to shock and vibration (especially when image acquisition system is on a moving vehicle), or minor defects in manufacturing. In the rectified image pair, each disparity vector is strictly horizontal, which simplifies the matching process as discussed further below with reference to the pixel matching module 206. In one embodiment, the rectification module 202 generates the rectified image pair using the Hartley method, which includes the steps of determining sparse feature correspondences, estimating a fundamental matrix, and computing projective transformations to map the epipoles of the stereoscopic image pair to infinity. The rectification module 202 may also generate new values for the effective focal lengths of the first camera and/or the second camera and the effective distance between their centers of projection. Rectification may be omitted if the images are already formed on the same image plane.

The image hashing module 204 receives the rectified image pair and generates binary hashes for pixels in the two images of the rectified image pair. As referred to herein, a binary hash is a string of binary values (e.g., a 16-bit string of 1's and 0's) that characterizes a pixel in the rectified image pair based on the value of the pixel and values of additional pixels in a pixel patch surrounding the pixel. In one embodiment, the image hashing module 204 computes a binary hash based on the random walk method described below with reference to FIGS. 4A-4B. In other embodiments, the image hashing module 204 computes a binary hash based on some other method. For example, the image hashing module 204 may compute a binary hash by assigning a value of 1 to each pixel in the pixel patch having a value larger than the pixel being characterized, assigning a value of 0 to each pixel in the pixel patch having a value smaller than the pixel being characterized, and arranging the binary values into a string.

In some embodiments, the image hashing module 204 creates a pair of binary hash arrays (one for the first image and one for the second image) and stores each binary hash in one of the binary hash arrays at an index representing the coordinates of the pixel corresponding to the binary hash. In one embodiment, the image hashing module 204 generates a binary hash for each pixel in the rectified image pair. In this embodiment, the image hashing module 204 uses a pair of binary hash arrays that have the same dimensions as the first and second images, and each binary hash is stored in one of the binary hash arrays at an index whose value is the same as the coordinates of the pixel corresponding to the binary hash. For example, the binary hash for the pixel at coordinates (80, 20) in the first image is stored at index [80, 20] in the first binary hash array.

The pixel matching module 206 receives a pair of binary hash arrays for a rectified image pair (i.e., a first hash array corresponding to the first image and a second hash array corresponding to the second image) and uses the binary hashes to match pixels in the first image to pixels in the second image. As referred to herein, a pixel in the first image and a pixel in the second image are matching if they depict the same physical point in the scene. The pixel matching module 206 outputs a disparity map that maps pixels in the first image to the matching pixels in the second image.

The disparity map is formed of multiple disparity vectors. A disparity vector is a vector that represents the coordinate difference between a pixel in the first image and matching the pixel in the second image. For example, in an image with a two-dimensional pixel coordinate system, a disparity vector of (0, 5) may indicate that the pixel at coordinates (100, 10) in the first image matches the pixel at coordinates (100, 15) in the second image. The disparity map may store the disparity vectors in a two-dimensional array where the index for each element in the array represents the coordinates for the corresponding pixel in the first image. For instance, the disparity vector of (0, 5) in the previous example may be stored in the two dimensional array at the index [100, 10] to signify that the disparity vector is associated with the pixel at coordinates (100, 10) in the first image.

Each disparity vector in the disparity map is inversely proportional to the distance between the image acquisition system 102 and the point in the scene corresponding to the disparity vector. A disparity vector with a larger value indicates that the corresponding point in the scene is closer to the image acquisition system 102 because a point in the scene that is closer to the image acquisition system 102 will appear at relatively dissimilar positions within the first image and the second image. Similarly, a disparity vector with a smaller value indicates that the corresponding point in the scene is farther away from the image acquisition system 102 because a point in the scene that is farther from the image acquisition system 102 will appear at relatively similar positions within the first image and the second image.

To find the pixel in the second image that matches a pixel in the first image (i.e., to find the correct disparity vector for each pixel in the first image) the pixel matching module 206 computes cost values for one or more possible disparity vectors. As referred to herein, a cost value is a measure of the difference between a given pixel in the first image and a given pixel in the second image. In one embodiment, the cost value is computed by computing the Hamming distance between the binary hashes of the two pixels (i.e., the number of different values in the two binary hashes). For example, the cost value associated with the disparity vector (0, 10) and the pixel at coordinates (80, 20) in the first image is the Hamming distance between the binary hash for pixel (80, 20) in first image and the binary hash for pixel (80, 30) in the second image. Thus, a smaller cost value indicates that the two pixels are relatively similar to each other and are more likely to depict the same physical point in the scene. In other embodiments, the cost value between two pixels may be generated without using binary hashes for the two pixels. For example, the cost value may be the sum of absolute differences in intensity between the pixel patches around the two pixels being compared. In these embodiments, the image hashing module 204 may be omitted.

In some embodiments, the pixel matching module 206 operates by computing a cost value between a pixel in a given row of the first image and each pixel in the same row in the second image. Because the two images were rectified by the rectification module 202, it can be assumed that the matching pixel is in the same row (i.e., the first component of the disparity vector is zero). After computing the cost values, the pixel matching module 206 selects, as the matching pixel, the pixel in the second image that yielded the lowest cost value. For example, if both images of the stereoscopic image pair have a resolution of 640×480 (i.e., VGA resolution), then the pixel matching module 206 computes 640 cost values to perform the matching process for one pixel in the first image (i.e., one for each pixel in the same row in the second image).

In other embodiments, the pixel matching module 206 performs the matching process in two main steps. The pixel matching module 206 begins by performing an initialization process that generates initial disparity vectors for the pixels in the first image, determines initial cost values for the pixels in the first image based on the initial disparity vectors, and stores the initial disparity vectors and initial cost values. Again, because the images were rectified by the rectification module 202, it can be assumed that the matching pixel is in the same row, so the initial disparity vectors are strictly horizontal (e.g., the initial disparity vectors may be two dimensional vectors with a vertical component of 0; alternatively, the initial disparity vectors may be one-dimensional vectors). Each initial disparity vector represents an initial value for the disparity vector that can either be propagated across the image or overwritten in the next step of the matching process.

After performing the initialization process, the pixel matching module 206 performs one or more propagation passes. In each propagation pass, the pixel matching module 206 iterates through each pixel in the first image. In each iteration, the pixel matching module 206 computes one or more additional cost values for the pixel using one or more additional disparity vectors. For example, the pixel matching module 206 may compute a cost value for the pixel using the disparity vector for an adjacent pixel. After computing the additional cost values, the pixel matching module 206 selects the lowest cost value from among the stored cost value and the additional cost values, identifies the disparity vector associated with the selected cost value, and stores the identified disparity vector. The stored disparity vectors collectively form the disparity map. This method of performing the matching process with separate initialization and propagation steps is described in further detail below with reference to FIGS. 5A-5C.

The post-processing module 208 receives one or more disparity maps and can perform a variety of post-processing steps on the disparity map(s) to reduce the amount of digital artifacts in the disparity map(s). For example, the post-processing module 208 may perform a consistency check. Prior to performing a consistency check, the pixel matching module 206 operates twice to compute separate disparity maps for the first image and the second image. Specifically, the pixel matching module 206 computes a first disparity map by matching pixels in the first image to pixels in the second image, and then the pixel matching module 206 computes a second disparity map by matching pixels in the second image to pixels in the first image. The post-processing module 208 receives the first disparity map and the second disparity map and performs the consistency check by checking whether the disparity vectors at matching coordinates in the disparity maps are consistent with each other. Disparity vectors are consistent with each other when they have the same value (or similar values, such as values that differ by less than a threshold amount or percentage) but opposite magnitudes. For example, the disparity vectors at matching coordinates in the disparity maps are consistent with each other if they have values of (10, 0) and (−10, 0), respectively. The consistency check preserves consistent disparity vectors and replaces inconsistent disparity vectors with a value indicating that the disparity vectors for the pixels at the corresponding coordinates are unknown. The post-processing module 208 may also perform one or more other post-processing steps, such as median filtering or bilateral filtering.

The depth map generation module 210 converts the disparity map(s) output by the pixel matching module 206 or (if applicable) the post-processing module 208 into depth map(s) by converting the disparity vectors in the disparity map(s) into depth measurements. In one embodiment, the depth map generation module 210 converts a disparity vector into a depth measurement by multiplying the effective focal length of the first camera by the effective distance between the centers of projection of the first and second cameras and dividing the result by the magnitude of the disparity vector. Values representing unknown disparities are converted to value representing unknown depths. In this description, the terms effective focal length and effective distance mean the values as modified by the rectification module 202.

The depth map conversion module 210 outputs the depth map(s) as the output for the depth sensing system 106 as a whole, and the depth map(s) can then be provided to another system that uses the depth map(s) for one or more applications. In other embodiments, the depth map generation module 210 is omitted, and the output for the depth sensing system 106 as a whole may be the disparity map(s) output by the post-processing module 208 or the pixel matching module 206.

FIG. 3 is a flow chart illustrating a method 300 for performing depth sensing, according to one embodiment. In other embodiments, the method 300 may include additional, fewer, or different steps, and some of the steps shown in the method 300 may be performed concurrently or in a different order. The method 300 may be performed, for example, by the depth sensing system 106 shown in FIG. 2, and the steps of the method 300 may be performed by the appropriate modules of the depth sensing system 106.

The depth sensing system 106 receives 302 a stereoscopic image pair as input (e.g., from an image acquisition system 102) and rectifies 304 the stereoscopic image pair to generate a rectified image pair. The depth sensing system 106 generates 306 binary hashes for pixels in the rectified image pair. In some embodiments, the depth sensing system 106 stores the binary hashes for the pixels of each rectified image in a binary hash array so that each binary hash is stored at an index representing the coordinates of the corresponding pixel.

The depth sensing system 106 uses the binary hashes to match 308 pixels in the first image to pixels in the second image. The output of the matching step 308 is a disparity map that maps pixels in the first image to the matching pixels in the second image. The depth sensing system 106 converts 310 the disparity map into a depth map and outputs 312 the depth map, and the depth map can then be used by another system for one or more different applications.

Although the method 300 shown in FIG. 3 does not include a post-processing step after the step 308 of matching pixels in the first image to pixels in the second image, the depth sensing system 106 may, in various embodiments, perform one or more post-processing steps on the disparity map generated in the matching step 308 before converting 310 the disparity map into a depth map and outputting 312 the depth map.

The descriptions for the depth sensing system 106 in FIG. 2 and the method 300 in FIG. 3 were presented with reference to a stereoscopic image pair comprising two images. In other embodiments, the depth sensing system 106 and the method 300 may be adapted to generate a depth map based on a stereoscopic image set containing three or more images. For example, the depth sensing system 106 may generate a plurality of disparity maps (e.g., by generating a disparity map between each pair of images, or by designating one image as a reference image and generating disparity maps between the reference images and the other image), generating a combined cost value for each disparity map (e.g., by computing a sum of the cost value for each disparity vector in the disparity map), selecting the disparity map that yields the lowest combined cost value, and generating a depth map based on the selected disparity map.

FIG. 4A is a flow chart illustrating a method 400 for generating a binary hash for one pixel, according to one embodiment. During the depth sensing method 300 shown in FIG. 3, this binary hash method 400 can be performed for multiple pixels when the depth sensing system 106 generates 306 binary hashes for pixels in the rectified image pair. For example, the image hashing module 204 may perform this binary hash method 400 for every pixel in the rectified image pair. For purposes of clarity, the pixel for which the binary hash is be generated is referred to herein as the pixel of interest, whereas the pixels in the pixel patch surrounding the pixel of interest are referred to as patch pixels.

Before the binary hash method 400 is performed for any pixels in the stereoscopic image pair, the image hashing module 204 generates a random walk through a pixel patch centered on the pixel of interest. The random walk is an ordered path that begins at the pixel of interest and traverses some or all of the patch pixels in a random order. In various embodiments, the pixel patch may be a square, a rectangle, a circle, an oval, or some other shape. For instance, FIG. 4B illustrates an example of a random walk through a square pixel patch. In the example shown in FIG. 4B, the pixel patch has dimensions of 5 pixels by 5 pixels, and the pixel of interest is in the middle of the pixel patch at coordinates (0, 0). The same random walk is used to generate binary hashes for pixels in both images of the stereoscopic image pair.

The random walk is defined as a series of vectors that specify the difference in coordinates between successive patch pixels along the random walk. In one embodiment, the image hashing module 204 generates the random walk by randomly selecting a series of patch pixels and then computing a series of vectors between successive patch pixels in the series of patch pixels. For instance, the example random walk shown in FIG. 4B, traverses the following randomly selected series of patch pixels: (1, −2), (2, −1), (0, 2), (0, 1), (−2, −1), (0, −2), (0, −1), and (−1, −2). Thus, the random walk shown in FIG. 4B is defined by the following series of vectors: (1, −2), (1, 1), (−2, 3), (0, −1), (−2, −2), (2, −1), (0, 1), and (−1, −1).

Referring back to FIG. 4A, the binary hash method 400 begins when the image hashing module 204 initializes 402 a bitstring for the pixel of interest. The bitstring has a length of zero when it is first initialized, but subsequent steps of the method 400 iteratively append values to the bitstring.

After initializing the bitstring, the image hashing module 204 performs the random walk beginning at the pixel of interest and identifies 404 the first patch pixel on the random walk. FIG. 4C illustrates the example random walk shown in FIG. 4B being performed beginning at the pixel of interest at coordinates (80, 20). In this example, the image hashing module 204 identifies 404 the patch pixel at coordinates (81, 18) as the first patch pixel because the first vector in the random walk is (1, −2).

Referring back to FIG. 4A, the image hashing module 204 computes 406 a difference in values between the identified patch pixel (e.g., the pixel at coordinates (81, 8)) and the pixel of interest (e.g., the pixel at coordinates (80, 20)). In one embodiment, the difference in values between the two pixels is the difference in the pixels' luminance values. In other embodiments, the difference in values may be defined in a different manner, such as by accounting for a difference in one or more chrominance values of the two pixels.

The image hashing module 204 compares the difference 408 to a threshold to select a binary value to append 410 to the bitstring. In one embodiment, the module 204 appends 410A a value of 1 to the bitstring if the difference exceeds the threshold, and the module 204 appends 410B a value of 0 to the bitstring if the difference is smaller than the threshold. In other embodiments, the binary values may be reversed (e.g., a value of 0 is appended if the difference exceeds the threshold and a value of 1 is appended if the difference is smaller than the threshold). In one embodiment, the threshold is a value set by an operator of the depth sensing system 106 that depends on the level of noise observed in the image sensor of the image acquisition system 102.

After appending 410 a value to the bitstring, the image hashing module 204 determines 412 whether there are any remaining vectors in the random walk. If the module 204 has already iterated through every vector of the random walk, then the module 204 stores 414 the bitstring as the binary hash for the pixel of interest (e.g., at an index in the binary hash array representing the coordinates of the pixel of interest). If there are remaining vectors in the random walk, then the module 204 uses the next vector in the random walk to identify the next path pixel traversed in the random walk and performs steps 404 through 412 of the method 400 for the next patch pixel. For instance, if the example random walk shown in FIG. 4C is continued for the pixel at coordinates (80, 20), the method 400 would identify 404 the next patch pixel at coordinates (82, 19) because the second vector in the random walk is (1, 1), and the method would proceed by performing the steps of computing 406 a difference between the identified patch pixel and the current patch pixel (e.g., the patch pixel at coordinates (81, 18)), comparing 408 the difference to the threshold, appending 410 a value to the bitstring, and determining 412 whether there are any remaining steps in the random walk.

This method 400 of generating a binary hash by performing a random walk is advantageous, among other reasons, because it allows for a binary hash to be computed more quickly than other methods while still providing a relatively accurate characterization of each pixel and the surrounding pixel patch. For instance, the example random walk shown in FIG. 4B, traverses only a subset of the pixels in the 5-by-5 pixel patch surrounding each pixel of interest. Specifically, this example random walk only traverses 8 of the 25 pixels in the patch, so binary hash has a length of 8 bits. In other methods, the binary hash may be generated using the value of each patch pixel (e.g., comparing the value of each patch pixel to the value of the pixel of interest), which yields a binary hash with a longer length of 25 bits. The shorter binary hashes generated with this method 400 can be computed more quickly, and they also allow the cost values (which are comparisons of two binary hashes) in the pixel matching step 308 to be computed more quickly.

FIG. 5A is a flow chart illustrating a method 500 for matching pixels in the first image of the stereoscopic image pair to pixels in the second image of the stereoscopic image pair to generate a disparity map for the first image, according to one embodiment. This pixel matching method 500, may be performed, for example, as the pixel matching step 308 in the method 300 shown in FIG. 3. In the discussion that follows, the disparity map is generated for the first image, and the vectors in the disparity map point to pixels in the second image. The choice of first image and second image is merely exemplary, and the method 500 may alternatively be applied to generate a disparity map for the second image (i.e., a disparity map with vectors that point to pixels in the first image).

The pixel matching module 206 defines 502 a disparity range. As referred to herein, a disparity range is the range of possible values for the disparity vectors in the disparity map. In other words, the disparity range represents the range of possible disparity vectors that the pixel matching module 206 will consider. In various embodiments, the disparity range may be defined in different manners.

The pixel matching module 206 may define 502 the disparity range in a manner that reflects one or more simplifying assumptions. In one embodiment, the disparity range is defined by two limitations: first, the disparity range is limited to horizontal vectors because it is assumed that the matching pixel in the second image will be in the same row (this assumption can be made because the stereoscopic image pair is rectified before the matching process takes place); and second, the disparity range is limited to a range of horizontal values spanning one-fourth the width of the image (e.g., between −80 and 79 for a VGA image with a width of 640 pixels) because it is assumed that no pixel will have a horizontal disparity greater than one-fourth the width of the image (i.e., it is assumed that no points in the scene will be closer to the image acquisition system 102 than implied by a disparity of one-fourth the image width).

The pixel matching module 206 generates 504 a set of initial disparity vectors for pixels in the first image. Each of the initial disparity vectors fall within the disparity range defined 502 by the pixel matching module 206. In one embodiment, the pixel matching module 206 randomly initializes the disparity vectors by randomly selecting an initial disparity vector within the disparity range for the each pixel in the first image. For example, the pixel matching module 206 may use a pseudo-random number generator to generate an integer between −80 and 79 for each pixel in the first image and store the integers as the horizontal components of the initial disparity vectors for the pixels.

In another embodiment, the pixel matching module 206 deterministically initializes the disparity vectors by selecting initial disparity vectors within the disparity range in a systematic and repeatable manner. The deterministic initialization can begin at an initial value for the horizontal component of the disparity vector and increment the value by a fixed amount as it selects initial disparity vectors for successive pixels. For example, the pixel matching module 206 selects an initial disparity vector of (−80, 0) to the pixel at coordinates (0, 0), an initial disparity vector of (−79, 0) to the pixel at coordinates (1, 0) and continues iterating through the pixels and incrementing the horizontal component of each subsequent initial disparity vector by 1. When the pixel matching module 206 reaches the end of the disparity range, the module 206 returns to beginning of the disparity range. Alternatively, the pixel matching module 206 may increment the horizontal component of subsequent initial disparity vectors by a different amount, such as 2 or 3, or the pixel matching module 206 may select the initial disparity vectors in some other systematic manner. For instance, the pixel matching module 206 may select the initial disparity vectors by performing one or more operations on the horizontal and vertical coordinates of the pixel (e.g., computing the sum of the horizontal and vertical coordinates of the pixel and performing a modulus operation on the sum to generate a value within the disparity range).

In embodiments where the matching method 500 is performed for multiple frames of a stereoscopic video feed, the pixel matching module 206 can initialize the disparity vectors for the current frame using disparity vectors that were generated for a previous frame. For example, if the matching method 500 is being performed for consecutive frames of a stereoscopic video feed, the pixel matching module 206 may assign, as the initial disparity vector for a given pixel in the current frame, the disparity vector that was generated for the pixel at the same coordinates in the preceding frame.

The pixel matching module 206 determines 504 cost values for pixels in the first image using the initial disparity vectors for the pixels in the first image. As described above with reference to FIG. 2, a cost value represents the difference between a pixel in the first image (hereinafter referred to as a first image pixel) and a pixel in the second image (hereinafter referred to as a second image pixel). Throughout the discussion for FIG. 5A, reference is made to computing a cost value for a first image pixel "using" a disparity vector. As referred to herein, a cost value is computed "using" a disparity vector by adding the disparity vector to the coordinates of the first image pixel to identify a second image pixel, and then computing the difference between the first image pixel and the second image pixel (e.g., computing the Hamming distance between the binary hashes of the two pixels).

After determining 504 the cost values, the pixel matching module 206 stores 506 the cost values in a cost array at indexes representing the coordinates of the corresponding first image pixels. The pixel matching module 206 also stores 506 the initial disparity vectors in a disparity vector array at indexes representing the coordinates of the corresponding pixels.

After storing 506 the initial disparity vectors and the cost values, the pixel matching module 206 performs one or more propagation passes 510 through the first image. At the beginning of a propagation pass 510, the pixel matching module 206 may select a direction for the propagation pass. In each propagation pass, the pixel matching module 206 iterates through the pixels in the first image. For instance, the module 206 may iterate through the pixels in a raster order (e.g., beginning at the pixel in the top left corner, iterating through each pixel in the top row from left to right, and proceeding through the subsequent rows from left to right). In one embodiment, the pixel matching module 206 may iterate through the pixels in each row from left to right but process the rows in parallel for greater speed. The module 206 may iterate through the pixels in different directions in different propagation passes (e.g., right to left from the bottom row to the top row, top to bottom from the left column to the right column, bottom to top from the left column to the right column). The steps 512 through 516 shown in FIG. 5A are performed during each iteration of a propagation pass; in other words, these steps 512 through 516 are performed separately for individual pixels in the first image in the order determined by the propagation pass.

FIGS. 5B and 5C are diagrams illustrating examples of how a propagation pass 510 operates during one iteration, according to one embodiment. For ease of description, the steps 512 through 516 in FIG. 5A will be discussed below in conjunction with the examples shown in FIGS. 5B and 5C. Furthermore, the pixel for the iteration being discussed is referred to as the current pixel (labeled as "pixel n" in FIGS. 5B and 5C), the pixels in the preceding and subsequent iteration are referred to as the preceding and subsequent pixels, respectively (labeled as "pixel n−1" and "pixel n+1," respectively, in FIGS. 5B and 5C), and the preceding and subsequent pixels are collectively referred to as the adjacent pixels.

The pixel matching module 206 computes 512 the mean adjacent cost value for the current pixel. To compute the mean adjacent cost value, the pixel matching module 206 computes a mean disparity vector by computing the mean of the stored disparity vectors for the adjacent pixels. Referring, for instance, to the example shown in FIG. 5B, the mean disparity vector for pixel n is the mean of the stored disparity vectors for pixels n−1 and n+1, which are (0, 4) and (0, 10), respectively. Thus, the mean disparity vector for pixel n in FIB. 5B is (0, 7). Similarly, the mean disparity vector for pixel n in FIG. 5C is (0, 10), which is the mean of the stored disparity vectors for pixels n−1 (i.e., (0, 5)) and n+1 (i.e., (0, 15)).

After computing the mean disparity vector for the current pixel, the pixel matching module 206 uses the mean disparity vector to compute 512 the mean adjacent cost value for the current pixel. As noted above, a disparity vector is used to compute a cost value by adding the disparity vector to the coordinates of the first image pixel to identify a second image pixel, and then computing the difference between the first image pixel and the second image pixel (e.g., computing the Hamming distance between the binary hashes of the two pixels). Thus, the mean disparity vector is used to compute 512 the mean adjacent cost value for the current pixel by adding the mean disparity vector to the coordinates of the current pixel to identify a pixel in the second image and then computing the difference between the second image pixel and the current pixel.

The pixel matching module 206 also computes 513 one or more additional cost values using other disparity vectors. In one embodiment, the pixel matching module 206 computes 513 a preceding cost value using the stored disparity vector for the preceding pixel. The pixel 25 matching module 206 may additionally compute 513 a subsequent cost value using the stored disparity vector for the subsequent pixel. In some embodiments, the pixel matching module 206 may also compute 513 other cost values using disparity vectors from elsewhere in the image, or generate an entirely new disparity vector (e.g., by using or reusing one of the initialization techniques described above) and use the new disparity vector to compute 513 a cost value.

The pixel matching module 206 selects 514 the lowest cost value from among the stored cost value for the current pixel and the one or more cost values that were computed. For example, if the pixel matching module 206 computed a mean adjacent cost value and a preceding cost value, then the module 206 selects 514 the lowest cost value from among the stored cost value, the mean adjacent cost value, and the preceding cost value. The pixel matching module 206 stores 516 the lowest cost value in the cost array and stores 516 the disparity vector that was used to generate the lowest cost value in the disparity vector array. If the lowest cost value was the cost value that was already stored, then this step 516 is skipped. The pixel matching module 206 then proceeds to perform steps 512 through 516 for the next pixel in the propagation pass and continues performing these steps 512 through 516 for subsequent pixels in the propagation pass until the propagation pass is complete. Once a propagation pass is complete, the pixel matching module 206 may perform another propagation pass in a different direction. For example, the pixel matching module 206 may perform a total of four propagation passes in four different directions (e.g., top to bottom, left to right, bottom to top, and right to left).

Performing propagation passes in this manner allows disparity vectors with favorable values (e.g., disparity vectors that yield relatively low cost values) to be propagated across the first image. This occurs because the selection step 516 selects the lowest cost value and corresponding disparity vector from among the stored cost value for a current pixel and the other cost values that are computed 512, 513 for the current pixel; thus, if one of the other disparity vectors (the mean disparity vector, preceding disparity vector, or subsequent disparity vector) yields a lower cost value than the stored cost value, then the other disparity vector is stored in the disparity vector array and replaces the disparity vector that was previously stored for that pixel. When this is repeated for each pixel in the first image, disparity vectors yielding higher cost value are replaced with disparity vectors that yield lower cost values. As additional propagation passes are performed, the disparity vectors yielding lower cost values are propagated across the first image.

This method 500 of matching pixels is advantageous, among other reasons, because it operates more quickly than other methods of matching pixels. Referring back to the example described in FIG. 2, another method of finding a second image pixel that matches a given first image pixel is to generate a cost value between the first image pixel and every second image pixel in the same row (e.g., generating 640 cost values for a VGA image). Even if this method is constrained to the same disparity range that is described above (i.e., the set of horizontal vectors whose length is less than one-fourth the width of the image), this method still leads to the generation of 160 cost values for each pixel of a VGA image. In addition, the number of cost values generated for each pixel increases in proportion to the resolution of the image. In contrast, the method 500 shown in FIG. 5A can operate by generating one initial cost value for each first image pixel and two or three additional cost values for each first image pixel during each propagation pass. If four propagation passes are performed, this leads to the generation of between 9 and 13 cost values for each pixel of the image. Furthermore, the number of cost values generated for each pixel remains constant regardless of the resolution of the image. This leads to a substantial improvement in computational efficiency, especially for images with higher resolutions such as 720p and 1080p.

FIG. 6 is a high-level block diagram illustrating an example of a computer boo for use as the depth sensing system 106, according to one embodiment. Illustrated are at least one processor 602 coupled to a chipset 604. The chipset 604 includes a memory controller hub 620 and an input/output (i/o) controller hub 622. A memory 606 and a graphics adapter 612 are coupled to the memory controller hub 620, and a display device 618 is coupled to the graphics adapter 612. A storage device 608, keyboard 610, pointing device 614, and network adapter 616 are coupled to the I/o controller hub 622. Other embodiments of the computer 600 have different architectures. For example, the memory 606 is directly coupled to the processor 202 in some embodiments.

The storage device 608 is a non-transitory computer-readable storage medium such as a hard drive, compact disk read-only memory (CD-ROM), DVD, solid-state memory device, or a magnetic tape drive. The storage device 608 can also include multiple instances of the media, such as an array of hard drives or a magnetic tape changer in communication with a library of magnetic tapes. The memory 606 holds instructions and data used by the processor 602. The pointing device 614 is used in combination with the keyboard 610 to input data into the computer system 600. The graphics adapter 612 displays images and other information on the display device 618. In some embodiments, the display device 618 includes a touch screen capability for receiving user input and selections. The network adapter 616 couples the computer 600 to 1 network. Some embodiments of the computer 600 have different and/or other components than those shown in FIG. 6.

The computer 600 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 608, loaded into the memory 606, and executed by the processor 602.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

I claim:

1. A method of generating a depth map representing distances between an image acquisition system and objects in a scene, the method comprising:
   receiving a first and second image of the scene;
   for each pixel of the first and second images, generating a fingerprint associated with the pixel by comparing the pixel to a pixel patch according to an ordered path, wherein the fingerprint comprises a binary hash that characterizes the pixel based on the comparison between the pixel and the pixels of the pixel patch;
   determining cost values based on fingerprint differences between the pixels in the first and second images;
   matching pixels in the first and second images that depict same points in the scene based on the cost values;
   determining a disparity map comprising a set of disparity vectors, wherein each disparity vector maps a pixel in the first image to the respective matched pixel in the second image, wherein determining the disparity map comprises:
      determining a set of test disparity vectors for a pixel of interest of the first image, wherein the set of test disparity vectors comprises a previous disparity vector and one or more test disparity vectors derived from disparity vectors for pixels adjacent to the pixel of interest; and
      determining a cost value associated with each test disparity vector of the set of test disparity vectors; and
   generating the depth map based on the disparity map, wherein the depth map represents distances between the image acquisition system and the objects in the scene.

2. The method of claim 1, wherein the first image and the second image are captured by the image acquisition system at a substantially same time.

3. The method of claim 1, wherein generating the fingerprint comprises:
   traversing a set of patch pixels of the pixel patch in the first image in the ordered path, wherein the ordered path begins at the pixel and traverses the set of patch pixels;
   for each traversed patch pixel in the set of patch pixels:
      computing a difference between the patch pixel and a preceding pixel in the order; and
      updating the fingerprint associated with the pixel of interest, wherein how the fingerprint is updated depends on whether the difference between the patch pixel and the preceding pixel exceeds a threshold; and
   storing the fingerprint for the pixel of interest.

4. The method of claim 3, wherein the ordered path comprises a random walk on the set of patch pixels.

5. The method of claim 1, wherein determining the disparity map comprises:

initializing a disparity vector for the pixel of interest of the first image, wherein the disparity vector maps the pixel of interest to a target pixel of the second image;

determining an initial cost value associated with the pixel of interest based on the fingerprint for the pixel of interest and the target pixel; and storing the cost value and the disparity vector.

6. The method of claim 1, wherein the set of test disparity vectors comprises a disparity vector calculated from a mean of disparity vectors associated with pixels adjacent to the pixel of interest.

7. The method of claim 5, wherein initializing the disparity vector for the pixel of interest comprises randomly selecting an initial disparity vector within the disparity range for the pixel of interest.

8. The method of claim 4, wherein the first and second images correspond to frames of a video.

9. A non-transitory computer-readable storage medium storing executable computer program instructions for generating a depth map representing distances between an image acquisition system and objects in a scene, the instructions when executed by at least one computer processor causing the computer processor to perform steps comprising:

receiving a first and second image of the scene;

for each pixel of the first and second images:

generating a fingerprint associated with the pixel, wherein generating the fingerprint comprises comparing the pixel to a pixel patch according to an ordered path, wherein the fingerprint comprises a binary hash that characterizes the pixel based on the comparison between the pixel and the pixel patch;

determining cost values based on fingerprint differences between the pixels in the first and second images;

matching pixels in the first and second images that depict same points in the scene based on the cost values;

determining a disparity map comprising a set of disparity vectors, wherein each disparity vector maps a pixel in the first image to the respective matched pixel in the second image, wherein determining the disparity map comprises:

determining a set of test disparity vectors for a pixel of interest of the first image, wherein the set of test disparity vectors comprises a previous disparity vector and one or more test disparity vectors derived from disparity vectors for pixels adjacent to the pixel of interest; and determining a cost value associated with each test disparity vector of the set of test disparity vectors; and generating the depth map based on the disparity map, wherein the depth map represents distances between the image acquisition system and the objects in the scene.

10. The computer-readable storage medium of claim 9, wherein the first image and the second image are captured by the image acquisition system at a substantially same time.

11. The computer-readable storage medium of claim 9, wherein generating the fingerprint comprises:

traversing a set of patch pixels of the pixel patch in the first image in the ordered path, wherein the ordered path begins at the pixel and traverses the set of patch pixels;

for each traversed patch pixel in the set of patch pixels:

computing a difference between the patch pixel and a preceding pixel in the order; and updating the fingerprint associated with the pixel of interest, wherein how the fingerprint is updated depends on whether the difference between the patch pixel and the preceding pixel exceeds a threshold; and storing the fingerprint for the pixel of interest.

12. The computer-readable storage medium of claim 11, wherein the ordered path comprises a random walk on the set of patch pixels.

13. The computer-readable storage medium of claim 9, wherein determining the disparity map comprises:

initializing a disparity vector for the pixel of interest of the first image, wherein the disparity vector maps the pixel of interest to a target pixel of the second image;

determining an initial cost value associated with the pixel of interest based on the fingerprint for the pixel of interest and the target pixel; and storing the cost value and the disparity vector.

14. The computer-readable storage medium of claim 11, wherein the set of test disparity vectors comprises a disparity vector calculated from a mean of disparity vectors associated with pixels adjacent to the pixel of interest.

15. The computer-readable storage medium of claim 12, wherein initializing the disparity vector for the pixel of interest comprises randomly selecting an initial disparity vector within the disparity range for the pixel of interest.

16. The computer-readable storage medium of claim 12, wherein the first and second images correspond to frames of a video.

* * * * *